(12) United States Patent
Zhang et al.

(10) Patent No.: US 9,467,912 B2
(45) Date of Patent: Oct. 11, 2016

(54) METHOD AND APPARATUS FOR MANAGING HANDOVERS

(71) Applicant: BROADCOM CORPORATION, Irvine, CA (US)

(72) Inventors: Lili Zhang, Beijing (CN); Haiming Wang, Beijing (CN); Wei Bai, Beijing (CN); Jing Han, Beijing (CN); Pengfei Sun, Beijing (CN); Xinying Gao, Beijing (CN)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/434,951

(22) PCT Filed: Oct. 10, 2012

(86) PCT No.: PCT/CN2012/082724
§ 371 (c)(1),
(2) Date: Apr. 10, 2015

(87) PCT Pub. No.: WO2014/056163
PCT Pub. Date: Apr. 17, 2014

(65) Prior Publication Data
US 2015/0264609 A1    Sep. 17, 2015

(51) Int. Cl.
*H04W 36/04* (2009.01)
*H04L 5/00* (2006.01)
(Continued)

(52) U.S. Cl.
CPC ............ *H04W 36/04* (2013.01); *H04L 5/0055* (2013.01); *H04W 36/0055* (2013.01); *H04W 36/30* (2013.01); *H04W 76/046* (2013.01); *H04W 84/045* (2013.01)

(58) Field of Classification Search
None
See application file for complete search history.

(56) References Cited

U.S. PATENT DOCUMENTS

2009/0040982 A1\*  2/2009  Ho .................. H04L 1/1874
                                                              370/331
2010/0157944 A1    6/2010  Horn
(Continued)

FOREIGN PATENT DOCUMENTS

| EP | 2 448 325 A1 | 5/2012 |
|---|---|---|
| WO | WO 2010/075474 A2 | 7/2010 |
| WO | WO 2012/093893 A2 | 7/2012 |

OTHER PUBLICATIONS

International Search Report issued Jul. 18, 2013 in PCT/CN2012/082724 filed Oct. 10, 2012.
(Continued)

*Primary Examiner* — Kimberly A Williams
(74) *Attorney, Agent, or Firm* — Oblon, McClelland, Maier & Neustadt, L.L.P.

(57) ABSTRACT

A method, apparatus, and computer program product are provided to manage handover procedures in a dual connection context. In the context of a method, a macro access point (MAP) may initiate a handover between a source and destination local area access point (LAAP) by causing a handover request to be transmitted to the destination LAAP. The method may further involve causing a handover command to be transmitted to a user equipment (UE), causing a data transfer inform message to be transmitted to the source LAAP, and receiving a UE context release message from the destination LAAP. In the context of another method, a LAAP may initiate a handover. The method may involve receiving a dual connection transfer request message from a source LAAP, receiving a dual connection transfer request acknowledge message from a destination LAAP and receiving a Path Switch Successful indication from a Mobility Management Entity.

20 Claims, 6 Drawing Sheets

(51) Int. Cl.
  *H04W 36/30* (2009.01)
  *H04W 36/00* (2009.01)
  *H04W 76/04* (2009.01)
  *H04W 84/04* (2009.01)

(56) References Cited

U.S. PATENT DOCUMENTS

| | | | |
|---|---|---|---|
| 2011/0274086 A1 | 11/2011 | Xu | |
| 2012/0183141 A1* | 7/2012 | Hapsari | H04L 63/061 380/272 |
| 2013/0029670 A1* | 1/2013 | Lee | H04W 36/08 455/444 |
| 2014/0004863 A1* | 1/2014 | Zhang | H04W 36/0033 455/444 |
| 2015/0111580 A1* | 4/2015 | Wu | H04W 36/0005 455/436 |
| 2015/0195865 A1* | 7/2015 | Lee | H04W 36/0061 455/426.1 |
| 2015/0215824 A1* | 7/2015 | Nigam | H04W 36/0055 370/331 |
| 2015/0215838 A1* | 7/2015 | Li | H04W 12/04 370/331 |
| 2015/0264666 A1* | 9/2015 | Yi | H04L 5/001 370/329 |
| 2015/0271744 A1* | 9/2015 | Liu | H04W 24/10 370/329 |
| 2015/0304913 A1* | 10/2015 | Uusitalo | H04W 36/02 455/444 |
| 2015/0358838 A1* | 12/2015 | Wei | H04W 24/04 370/228 |

OTHER PUBLICATIONS

European Search Report issued Jun. 9, 2016 in corresponding European Application No. 12886381.8 (5 pages).

"MCG handover for Dual Connectivity", 3GPP Draft; R2-140531 MCG Handover for Dual Connectivity, $3^{rd}$ Generation Partnership Project (3GPP), Prague, Czech Republic, Feb. 10-14, 2014 (8 pages).

"$3^{rd}$ Generation Partnership Project: Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", vol. RAN WG2, No. V11.3.0, Sep. 24, 2012, pp. 1-205, XP050649950 (205 pages).

* cited by examiner

METHOD AND APPARATUS FOR MANAGING HANDOVERS

TECHNOLOGICAL FIELD

An example embodiment of the present invention relates generally to wireless networks and, more particularly, to managing handover procedures in a dual connection context.

BACKGROUND

Due to booms in the demand for wireless internet access, demands on wireless networks, such as cellular networks, are expected to soar in the foreseeable future. Among the most promising strategies for satisfying this rapidly increasing demand is to reduce the size of network cells. Over the past 50 years, reductions in cell size have increased wireless network capacity by a factor of over 2700. The benefits to network capacity caused by cell size reduction mean that the incorporation of local area (LA) networks into broader network infrastructure may be the next frontier in the evolution of cellular networks, such as Long Term Evolution (LTE) networks.

In this regard, the concept of "dual connection" has recently emerged as a way to incorporate LAs into cellular networks. The basic idea is to let a user equipment (UE) connect to both a macro access point and a LA access point simultaneously, with the macro access point controlling some connection and signalling aspects, such as mobility functions, while offloading most data transmission to the LA access point. This allows the UE to benefit from the high data rate and low required transmission power provided by the LA cell due to its small distance. The concept of dual connection is also referred to as inter-eNB CA (inter-enhanced Node B Carrier Aggregation), User/Control (U/C) plane split, multi-stream, etc. Although dual connection is a promising concept, it is yet unclear how handovers, especially between LA access points, may be most effectively carried out.

BRIEF SUMMARY

A method, apparatus and computer program product are therefore provided according to an example embodiment in order to manage handover procedures in a dual connection context. In this regard, the method, apparatus, and computer program product of an example embodiment may allow a macro access point (MAP) in connection with a UE to initiate and manage a handover of the UE from a source LA access point (LAAP) to a destination LAAP. According to the method, apparatus, and computer program product of another example embodiment, handovers may be initiated by an LAAP, which indicates the handover to the MAP.

In one embodiment, a method is provided that includes causing a handover request message to be transmitted to a destination local area access point (LAAP), causing a handover command to be transmitted to a user equipment (UE), causing a data transfer inform message to be transmitted to a source LAAP, and receiving a UE context release message from the destination LAAP.

In another embodiment, a method is provided that includes receiving a dual connection transfer request message from a source local area access point (LAAP), receiving a dual connection transfer request acknowledge (ACK) message from a destination LAAP, and receiving a Path Switch Successful indication from a Mobility Management Entity (MME).

In another embodiment, a method is provided that includes causing a handover request message to be transmitted to a destination local areas access point (LAAP), causing a dual connection transfer request message to be transmitted to a macro access point (MAP), and causing a sequence number (SN) status transfer message to be transmitted to the MAP.

In a further embodiment, an apparatus is provided that includes at least one processor and at least one memory storing program code instructions therein, the memory and program code instructions being configured to, with the processor, cause the apparatus to at least cause a handover request message to be transmitted to a destination local area access point (LAAP), cause a handover command to be transmitted to a user equipment (UE), cause a data transfer inform message to be transmitted to a source LAAP, and receive a UE context release message from the destination LAAP.

In another embodiment, an apparatus is provided that includes at least one processor and at least one memory storing program code instructions therein, the memory and program code instructions being configured to, with the processor, cause the apparatus to at least receive a dual connection transfer request message from a source local area access point (LAAP), receive a dual connection transfer request acknowledge (ACK) message from a destination LAAP, and receive a Path Switch Successful indication from a Mobility Management Entity (MME).

In a further embodiment, an apparatus is provided that includes at least one processor and at least one memory storing program code instructions therein, the memory and program code instructions being configured to, with the processor, cause the apparatus to at least cause a handover request message to be transmitted to a destination local areas access point (LAAP), cause a dual connection transfer request message to be transmitted to a macro access point (MAP), and cause a sequence number (SN) status transfer message to be transmitted to the MAP.

In a further embodiment, a computer program product is provided that includes a non-transitory computer readable medium storing computer program code portions therein, the computer program code portions being configured to, upon execution, cause an apparatus to at least cause a handover request message to be transmitted to a destination local area access point (LAAP), cause a handover command to be transmitted to a user equipment (UE), cause a data transfer inform message to be transmitted to a source LAAP, and receive a UE context release message from the destination LAAP.

In another embodiment, a computer program product is provided that includes a non-transitory computer readable medium storing computer program code portions therein, the computer program code portions being configured to, upon execution, cause an apparatus to at least receive a dual connection transfer request message from a source local area access point (LAAP), receive a dual connection transfer request acknowledge (ACK) message from a destination LAAP, and receive a Path Switch Successful indication from a Mobility Management Entity (MME).

In a further embodiment, a computer program product is provided that includes a non-transitory computer readable medium storing computer program code portions therein, the computer program code portions being configured to, upon execution, cause an apparatus to at least cause a handover request message to be transmitted to a destination local areas access point (LAAP), cause a dual connection transfer request message to be transmitted to a macro access point (MAP), and cause a sequence number (SN) status transfer message to be transmitted to the MAP.

In yet another embodiment, an apparatus is provided that includes means for causing a handover request message to be transmitted to a destination local area access point (LAAP), means for causing a handover command to be transmitted to a user equipment (UE), means for causing a data transfer inform message to be transmitted to a source LAAP, and means for receiving a UE context release message from the destination LAAP.

In an even further embodiment, an apparatus is provided that includes means for receiving a dual connection transfer request message from a source local area access point (LAAP), means for receiving a dual connection transfer request acknowledge (ACK) message from a destination LAAP, and means for receiving a Path Switch Successful indication from a Mobility Management Entity (MME).

In yet another embodiment, an apparatus is provided that includes means for causing a handover request message to be transmitted to a destination local areas access point (LAAP), means for causing a dual connection transfer request message to be transmitted to a macro access point (MAP), and means for causing a sequence number (SN) status transfer message to be transmitted to the MAP.

BRIEF DESCRIPTION OF THE DRAWINGS

Figure 1:
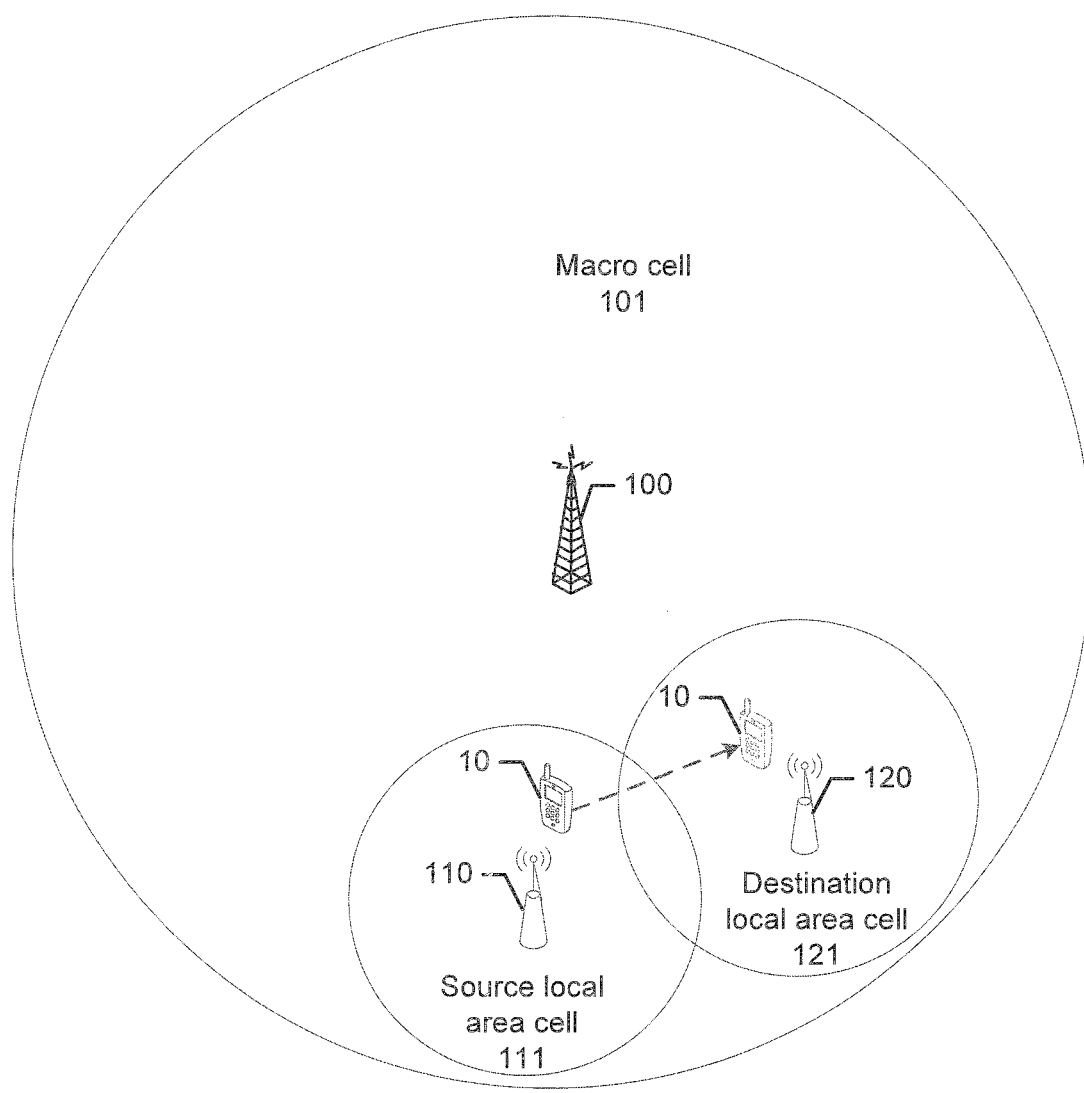
Figure 2:
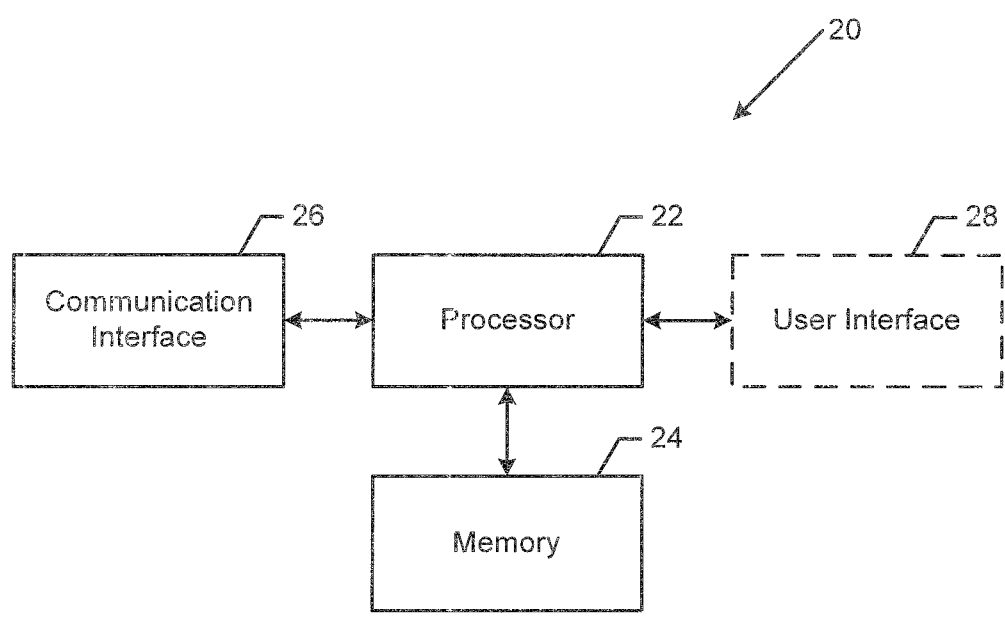
Figure 3:
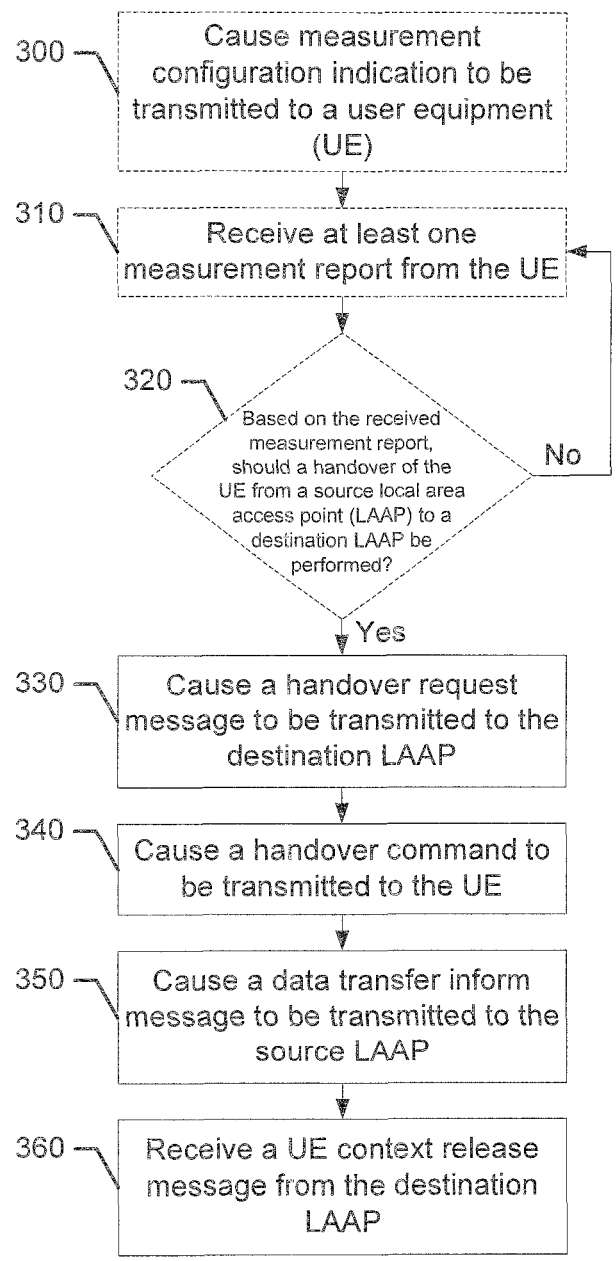
Figure 4:
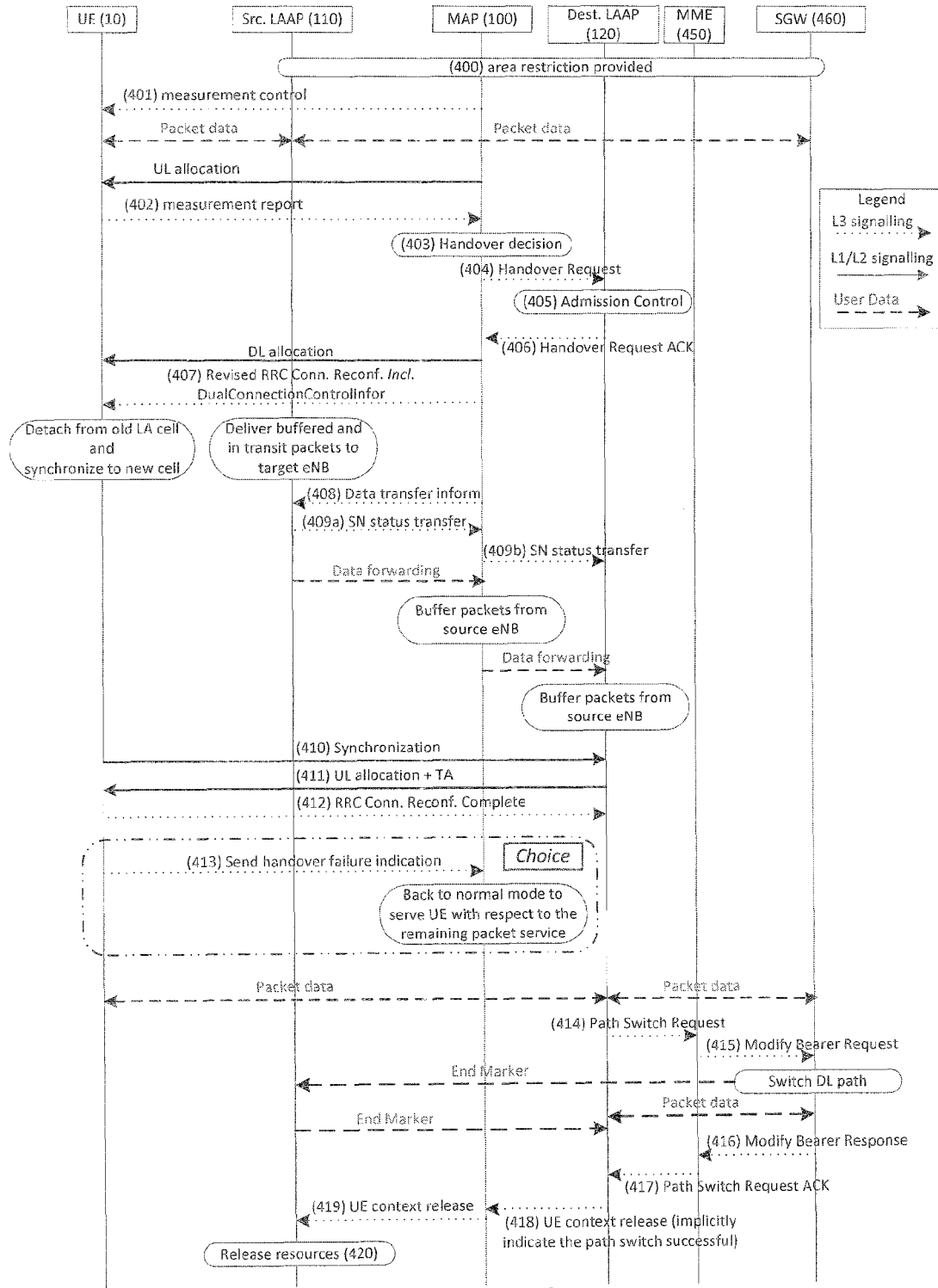
Figure 5:
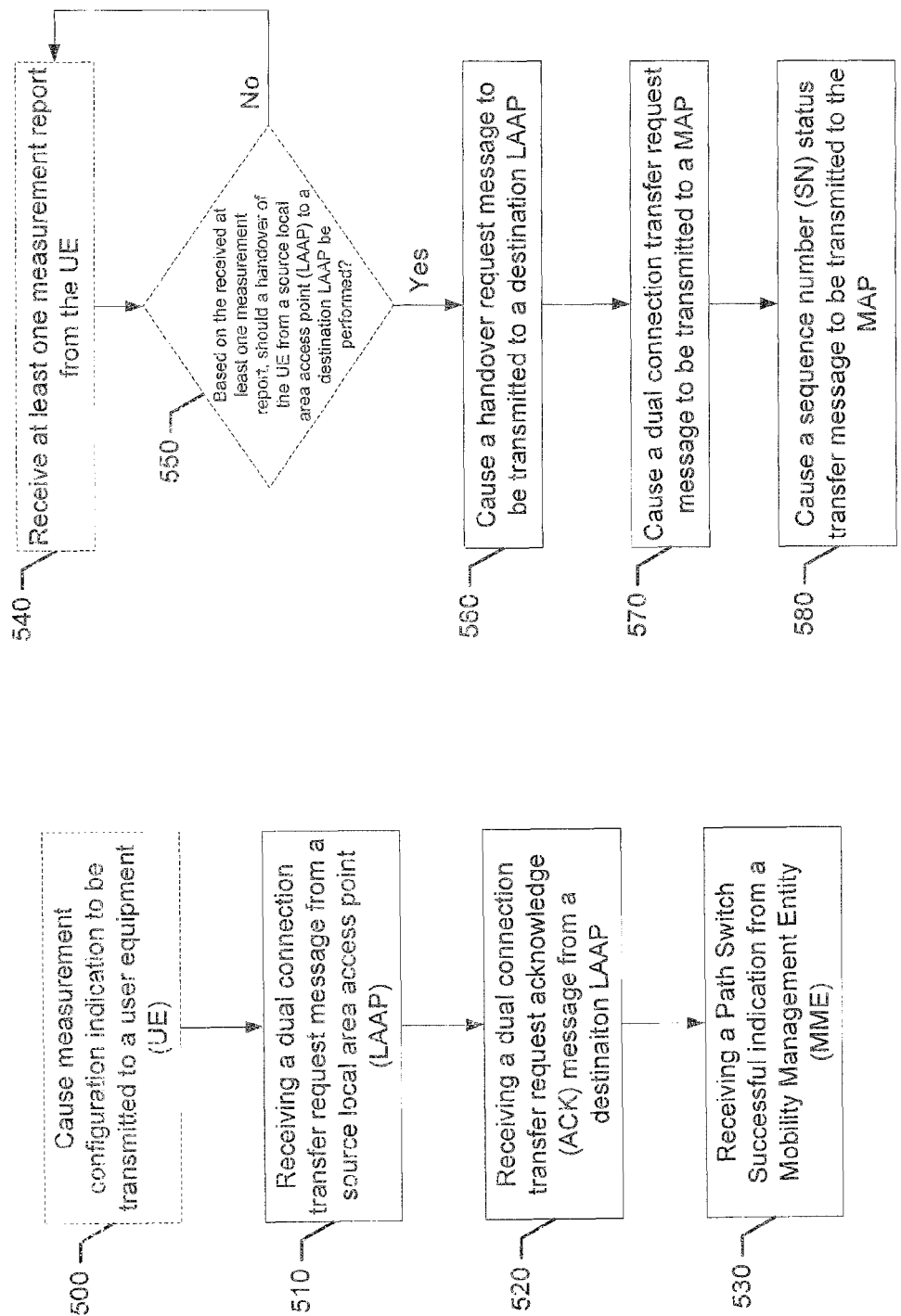
Figure 6:
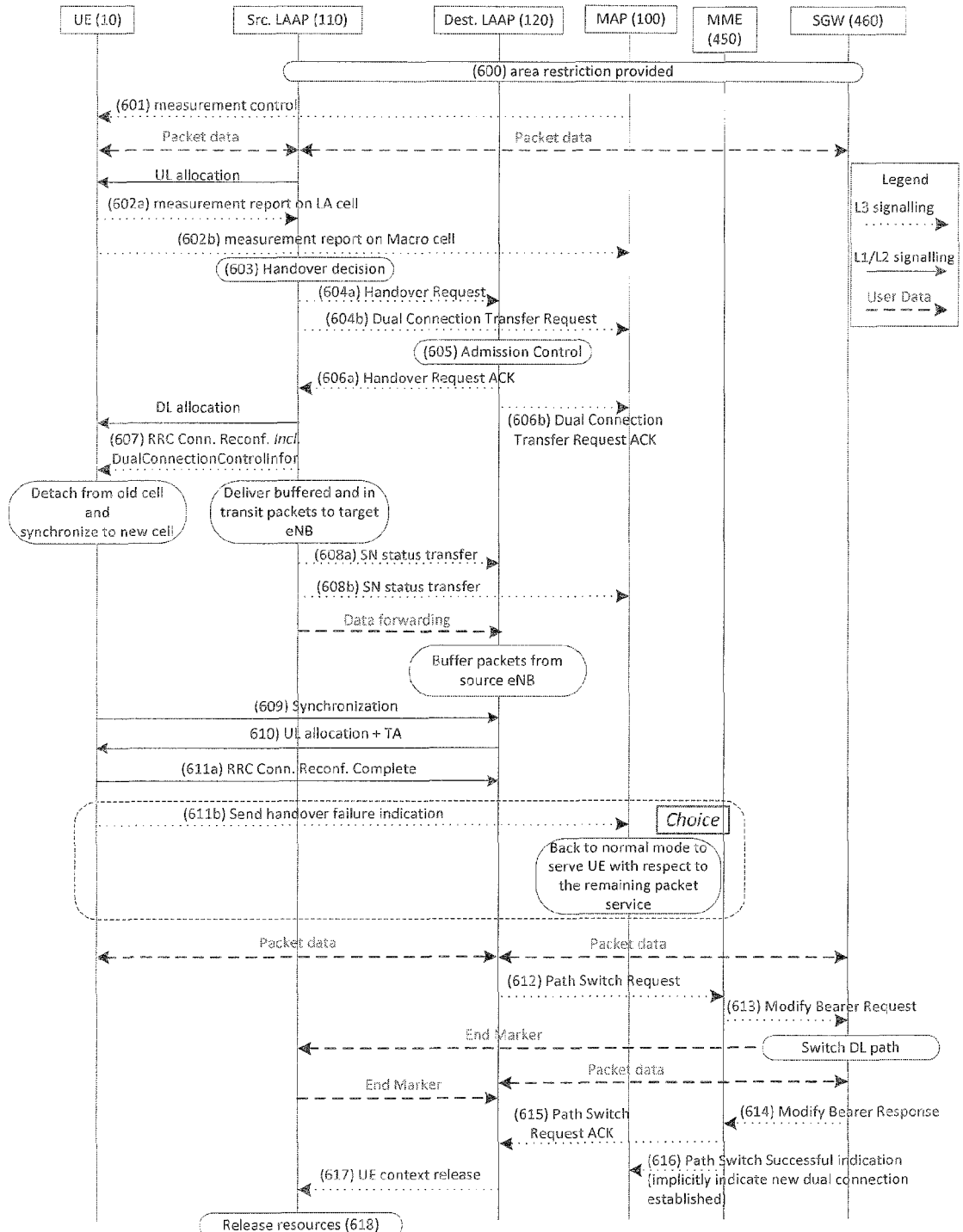

Having thus described certain example embodiments of the present disclosure in general terms, reference will now be made to the accompanying drawings, which are not necessarily drawn to scale, and wherein:

FIG. 1 is an illustration of a dual connection system which may benefit from embodiments of the present invention;

FIG. 2 is a block diagram of an apparatus that may be configured in accordance with an example embodiment of the present invention;

FIG. 3 is a flowchart depicting the operations performed by an apparatus embodied by or otherwise associated with a macro access point;

FIG. 4 is a signaling diagram illustrating operations performed in accordance with an embodiment of the present invention;

FIG. 5a is a flowchart depicting the operations performed by an apparatus embodied by or otherwise associated with a macro access point FIG. 5b is a flowchart depicting the operations performed by an apparatus embodied by or otherwise associated with a local area access point; and FIG. 6 is a signaling diagram illustrating operations performed in accordance with another embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following:
(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

Referring now to FIG. 1, a system supporting dual connection is depicted. As depicted, during dual connection a user equipment (UE), such as UE 10, may initially by in communication with, e.g., connected to, both a macro access point (MAP) 100, which serves a macro cell 101, and a source local access point (LAAP) 110, which supports a source local area cell 111. As shown, a macro cell may cover a larger area than local cells, and may even overlap with or encompass one or more local cells. FIG. 1 also depicts an example scenario of when a handover may be required. As shown, the UE 10 may move out of range of the source local area cell 111 and into range of the destination, e.g., target, local area cell 121, served by the destination, e.g., target, LAAP 120, which may require that the UE 10 be handed over from the source LAAP 110 to the destination LAAP 120 (the solid-line depiction of UE 10 depicts its initial location in space, movement in space is depicted via a dashed arrow, and the dotted-line depiction of UE 10 depicts its end location). The system depicted in FIG. 1 may support communications between a user equipment, such as the user equipment 10, and a network, such as a Universal Mobile Telecommunications System (UMTS) network, a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a Frequency-Division Multiplexing (FDM) network, e.g., an Orthogonal Frequency-Division Multiplexing (OFDM) network, a General Packet Radio Service (GPRS) network or other type of network, via one or more access points 100, 110, and 120.

As used herein, an access point refers to any communication device which provides connectivity to a network, such as a base station, an access node, or any equivalent, such as a Node B, an evolved Node B (eNB), a relay node, or other type of access point. The term "user equipment" (UE) includes any mobile communication device such as, for example, a mobile telephone, portable digital assistant (PDA), pager, laptop computer, a tablet computer, or any of numerous other hand held or portable communication devices, computation devices, content generation devices, content consumption devices, data card, Universal Serial Bus (USB) dongle, or combinations thereof. The communications between the UE 10 and any of access points 100, 110, or 120 may include the transmission of data via an uplink that is granted between the user equipment 10, 11, or 12 and access point 100, 110 or 120.

The user equipment 10 as well as access points 100, 110, or 120 may embody or otherwise be associated with an apparatus 20 that is generally depicted in FIG. 2 and that may be configured in accordance with an example embodiment of the present invention as described below. However, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with a processing system including processing circuitry, such as the processor 22 and, in some embodiments, the memory 24, which is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry may include a processor 22 and memory 24 that may be in communication with or otherwise control a communication interface 26 and, in some cases in which the apparatus is embodied by the user equipment 10, a user interface 28. As such, the processing circuitry may be embodied as a circuit chip (e.g., an integrated circuit chip) configured (e.g., with hardware, software or a combination of hardware and software) to perform operations described herein. However, in some embodiments taken in the context of the user equipment 10 or an access point 100, 110, 120, the processing circuitry may be embodied as a portion of user equipment or the access point.

The user interface 28 (if implemented in embodiments of the apparatus 20 embodied by the user equipment 10) may be in communication with the processing circuitry to receive an indication of a user input at the user interface and/or to provide an audible, visual, mechanical or other output to the user. As such, the user interface 28 may include, for example, a keyboard, a mouse, a joystick, a display, a touch screen, a microphone, a speaker, and/or other input/output mechanisms.

The communication interface 26 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network and/or any other device or module in communication with the processing circuitry, such as between the user equipment 10 and an access point 100, 110, 120. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 24 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 22. Additionally or alternatively, the memory could be configured to store instructions, e.g., program code portions, for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 22 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 24 or otherwise accessible to the processor. As such, whether configured by hardware or by a combination of hardware and software, the processor may represent an entity (e.g., physically embodied in circuitry—in the form of processing circuitry) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

FIGS. 3, 5a, and 5b are flowcharts illustrating operations performed by a method, apparatus and computer program product, such as apparatus 20 of FIG. 2 in accordance with example embodiments of the present invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions, e.g., program code portions. In this regard, the computer program instructions which embody the procedures described above may be stored by a memory 24 of an apparatus employing an embodiment of the present invention and executed by a processor 22 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 3 and 4, when executed, convert a computer or processing circuitry into a particular machine configured to perform an example embodiment of the present invention. Accordingly, the operations of FIG. 4 define an algorithm for configuring a computer or processing circuitry, e.g., processor, to perform an example embodiment. In some cases, a general purpose computer may be provided with an instance of the processor which performs the algorithms of FIG. 3, 5a, or 5b to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein.

As noted in the Background section, dual connection is a promising solution to enhancing wireless network capacity and robustness. When a UE, such as UE 10, is connected to a macro access point (MAP) 100 and local area access point (LAAP) simultaneously, there are numerous different possible handover scenarios. One typical case, which is illustrated in FIG. 1, is a handover between two neighboring LA cells 111, 121 in one macro cell 100. Such a handover may need to occur, for example, when a UE 10 is moving across these neighboring LA cells. There is currently no defined procedure to smoothly handover a UE between these neighboring LA cells in a dual connection context.

Perhaps the most straightforward possible solution would be to let UE manage the handover between two LA cells, and reuse current handover procedures. However, one of the most important benefits of dual connection is to let the MAP handle mobility while using LA cells for data offloading, reusing current handover procedures without any assistance from the MAP may not be desirable and, indeed, may be contradictive to the motivations for implementing dual connection in the first place. Moreover, performing a handover from one LA cell to another without any assistance from the MAP may also cause a higher possibility of handover failure or even radio link failure, as the rapidly varying path loss which may occur as the UE 10 moves to the LA cell edge may cause signal strength degradation.

Accordingly, various handover procedures for use with dual connection are herein described. In a first embodiment, a MAP, such as the MAP 100 of FIG. 1, may imitate and coordinate the handover procedure. According to a second embodiment, an LAAP may initiate the handover procedure and provide indications to the MAP of the same.

Thus, having described general concepts of the present invention, reference will now be made to FIGS. 3-6, so as to discuss example embodiments of the present invention in further detail. In this regard, the flowcharts contained in FIGS. 3 and 5a, along with their accompanying discussion, highlight particular operations performed by an apparatus, such as the apparatus 20 depicted in FIG. 2, embodied by or otherwise associated with a MAP, such as the MAP 100 depicted in FIG. 1. FIG. 5b, along with its accompanying discussion, highlights particular operations performed by an apparatus, such as the apparatus 20 depicted in FIG. 2, embodied by or otherwise associated with a source LAAP, such as the source LAAP 110 depicted in FIG. 1. Details regarding these operations and their associated signals will be further provided in the discussion accompanying FIGS. 4 and 6.

Before proceeding, it will also be understood that FIGS. 4 and 6, along with their accompanying discussion, illustrate additional operations which may be performed by one or more apparatuses, such as the apparatus 20 depicted in FIG. 2, which may be associated with various other network entities. In this regard, each of the UE 10, MAP 100, source LAAP 110, destination LAAP 120, Mobility Management Entity (MME) 450, and Serving Gateway (SGW) 460 may have a respective apparatus, such as the apparatus 20 depicted in FIG. 2, embodied by or otherwise associated therewith, and including means, such as the processing circuitry, the processor 22, the communications interface 26 or the like, for causing their respective network entities to carry out the operations depicted in FIGS. 4 and 6, (e.g., for causing their respective associated network entities to transmit and/or receive the depicted signals), as will be described below.

Turning first to FIGS. 3 and 4, example embodiments in which a MAP initiates and coordinates handover procedures will now be described. In this regard, an apparatus 20 embodied by or otherwise associated with a MAP, such as MAP 100, may include means, such as the processing circuitry, the processor 22, the communications interface 26 or the like, for causing a measurement configuration indication to be transmitted to a UE, such as UE 10. See operation 300 of FIG. 3. The measurement configuration indication may, for example, include an indication that measurement reports containing information regarding macro and local area cells, such as macro cell 101, local area cell 111, and local area cell 121, are to be transmitted to the MAP 100. Thus, the apparatus 20 may further include means, such as those just described, for receiving at least one measurement report from the UE 10. See operation 310. The apparatus 20 may further include means, such as those described above, for determining, based on the at least one received measurement report, whether a handover of the UE 10 from a source LA cell, e.g., source LA cell 111 served by LAAP 110, to a destination LA cell, e.g., destination LA cell 121 served by LAAP 120. See operation 320. In an instance in which it is determined that a handover should not be performed, the apparatus may, for example, receive one or more further measurement reports and similarly determine, based on those measurement reports, whether a handover should then be performed. Conversely, the apparatus may proceed with the operations described below in an instance in which it is determined that a handover should be performed.

In this regard, the apparatus 20 may further include means, such as the processing circuitry, the processor 22, the communications interface 26 or the like, for causing a handover request message to be transmitted to the destination LAAP 120. See operation 330. The apparatus 20 may further include means, such as those just mentioned above, for causing a handover command to transmitted to the UE 10. See operation 340. The apparatus 20 may further include means, such as those discussed above, for causing a data transfer inform message to be transmitted to the source LAAP 110. See operation 350. The apparatus 20 may also include means, such as those discussed above, for receiving a UE context release message from the destination LAAP 120. See operation 360.

Thus, having described, from the perspective of an apparatus embodied by or otherwise associated with a MAP, some of the operations of example embodiments in which a MAP initiates and coordinates handover procedures, these operations, as well as others carried out by additional network entities, will now be discussed in further detail with reference to the signaling diagram depicted in FIG. 4. In the following description, the various network entities, such as the MAP 100, source LAAP 110, etc. will be described as performing various operations. However, it will be understood that this is merely for the sake of brevity, and that the various operations are in fact performed by respective apparatuses, such as the apparatus 20 depicted in FIG. 2, embodied by or otherwise associated with the respective network entities and including means, such as the processing circuitry, the processor 22, the communications interface 26 or the like, for carrying out the described operations. In this regard, reference will now be made to numbered operations 400-419:

At operation 400, area restriction information may be provided. For example, a UE context may be provided which includes information regarding roaming restrictions. Information regarding the UE context, such as the area restriction information, may, for example, be stored at source LAAP 110 and may be provided, for example, either at connection establishment or during a Timing Advance (TA) update.

At operation 401, the MAP 100 may configure UE measurement procedures according to the area restriction information and may transmit a measurement configuration indication to the UE 10. The measurement configuration indication may, for example, contain one or more parameters indicating that measurements on Macro cells, such as macro cell 101, and LA cells, such as LA cells 111 and 121, will be reported to the MAP 100. Measurements provided to the MAP may assist the function controlling the UE's connection mobility.

At operation 402, the UE 10 may transmit at least one measurement report. The circumstances under which the UE 10 transmits the measurement report may be set, for example, by system information, a relevant specification, or by any other source. Based on the received measurement configuration, the UE 10 may transmit information regarding measurements performed on both Macro cells and LA cells to the MAP only, e.g., by transmitting one or more measurement reports, such as an LA cell measurement report and a Macro cell measurement report.

At operation 403, the MAP 100 may determine, based on the at least one measurement report on LA cells, whether to hand off the UE. The determination may further be based on, for example, Radio Resource Management (RRM) information.

At operation 404, the MAP 100 may cause a handover request message to be transmitted to the destination LAAP 120. The "handover request" message may include information necessary to prepare the handover at the destination side. For example, the handover request may include one or more of: a UE X2 signalling context reference at the source LAAP; a UE S1 Evolved Packet Core (EPC) signalling context reference; a destination cell ID; a $K_{eNB*}$ key; a Radio Resource Control (RRC) context, which may include a Cell Radio Network Temporary Identifier (C-RNTI) of the UE in the source LAAP; Access Stratum (AS) configuration information; E-RAB (EUTRAN Radio Access Bearer) context; physical layer ID of the source LA cell; and/or short MAC-I (Message Authentication Code for Integrity). The UE X2 and/or UE S1 signalling references may enable the target LAAP to address the source LAAP and the EPC. The E-RAB context may include Radio Network Layer (RNL) and Transport Network Layer (TNL) addressing information, and Quality of Service (QoS) profiles of the E-RABs.

At operation 405, the destination LAAP 120 may perform Admission Control based on the received E-RAB QoS information, e.g., to increase the likelihood of a successful handover, if the resources can be granted by the destination LAAP 121. The destination LAAP 121 may configure the required resources according to the received E-RAB QoS information and may reserve a C-RNTI and optionally a Random Access Channel (RACH) preamble. The AS-configuration to be used in the destination LA cell 121 can either be specified independently (e.g., it may be "established") or as a delta compared to the AS-configuration used in the source LA cell 111 (e.g., it may be a "reconfiguration").

At operation 406, the destination LAAP 120 may prepare the handover with Layer-1/Layer-2 (L1/L2) and may transmit a "handover request acknowledge" message to the MAP. The handover request acknowledge message may include a transparent container to be sent to the UE as an RRC message to perform the handover. The container may include a new C-RNTI, target LAAP security algorithm identifiers for the selected security algorithms, a dedicated RACH preamble, and/or other possible parameters, such as access parameters, System Information Blocks (SIBs), etc. The handover request acknowledge message may also include RNL/TNL information for the forwarding tunnels, if necessary. As soon as the MAP 100 receives the handover request acknowledge, or as soon as the transmission of the handover command is initiated in the downlink, data forwarding may be initiated.

At operation 407, the MAP 100 may generate an RRC message, such as an RRCConnectionReconfiguration message which may include a DualConnectionControlInfor Information Element (IE), and then transmit the RRC message to the UE 10. The MAP 100 may perform any necessary integrity protection and ciphering of the message. The UE 10 may receive the RRCConnectionReconfiguration message with necessary parameters (e.g., new C-RNTI, destination LAAP security algorithm identifiers, and/or optionally dedicated RACH preamble, target eNB SIBs, etc.) and may be commanded by the MAP to perform the handover. The UE 10 does not need to delay the handover execution for delivering HARQ/ARQ (Hybrid Automatic Repeat Request/Automatic Repeat Request) responses to the MAP 100. The RRCConnectionReconfiguration message may also contain Dual Connection Link Release Indication information, which may, for example, be a one bit indicator which informs the UE 10 as to whether the current LA connection link should be released or the dual connection should be released.

At operation 408, the MAP may transmit a Data Transfer Inform to the source LAAP to initiate data forwarding.

At operation 409a, the source LAAP may transmit a "Sequence Number (SN) status transfer" message to the MAP to convey an uplink Packet Data Convergence Protocol (PDCP) SN receiver status and a downlink PDCP SN transmitter status of E-RABs for which. PDCP status preservation applies (e.g., for Radio Link Control (RLC) Acknowledged Mode (AM)). The uplink (UL) PDCP SN receiver status includes at least the PDCP SN of the first missing UL SDU and may include a bit map of the receive status of the out of sequence UL Service Data Units (SDUs) that the UE 10 needs to retransmit in the destination LA cell 121, if there are any such SDUs. The downlink PDCP SN transmitter status indicates the next PDCP SN that the MAP 100 shall assign to new SDUs, not having a PDCP SN yet. The source LAAP 110 may omit sending this message, for example, if none of the E-RABs of the UE shall be treated with PDCP status preservation.

At operation 409b, the MAP may transmit an SN status transfer message to the destination LAAP.

At operation 410, after receiving the RRCConnectionReconfiguration message including the Dual Connection Link Release Indication, the UE 10 may detach from the corresponding cell and perform synchronisation to the destination LAAP 120 and access the destination cell 121 via RACH, following a contention-free procedure if a dedicated RACH preamble was indicated in the DualConnectionControlInfor, or following a contention-based procedure if no dedicated preamble was indicated. The UE 10 may derive the target LAAP 120 specific keys and configure the selected security algorithms to be used in the destination LA cell.

At operation 411, the destination LAAP may respond by transmitting UL allocation and timing advance.

At operation 412, once the UE 10 has successfully accessed the destination LA cell 121, the UE may transmit the RRCConnectionReconfigurationComplete message, e.g., including C-RNTI, to confirm the handover, along with an uplink Buffer Status Report, whenever possible, to the destination LAAP 120 to indicate that the handover procedure is completed for the UE 10. The destination LAAP 120 may then verify the C-RNTI sent in the RRCConnectionReconfigurationComplete message. The destination LAAP may then begin sending data to the UE 10 if the handover was successful.

At operation 413, in an instance in which handover failure occurs, the UE 10 may send a handover failure indication to the MAP 100. The MAP 100 may then return to a normal single connection mode to serve the UE 10 with respect to the remaining packet service.

At operation 414, in an instance in which the handover was successful, the destination LAAP may send a "path switch request" message to an MME 450 to inform that the UE 10 has changed cells.

At operation 415, the MME 450 may transmit a "modify bearer request" message to the Serving Gateway (SGW) 460. The SGW may then switch the downlink data path to the destination side. The SGW 460 may then send one or more "end marker" packets via the old path to the source LAAP and then can release any U-plane/TNL resources towards the source LAAP.

At operation 416, the SGW 460 may send a "modify bearer response" message to the MME 450.

At operation 417, the MME 450 may confirm the path switch request message by transmitting a "path switch request acknowledge" message to the destination LAAP 120.

At operation 418, the destination LAAP 120 may transmit a "UE context release" message to the MAP 100, and may implicitly indicate the path switch is successful and a new dual connection establishment is completed.

At operation 419, the MAP 100 may transmit a UE context release message to the source LAAP 110, which informs the source LAAP 110 of the successful handover and triggers the release of resources by the source LAAP 110. The source LAAP 110 and MAP 100 may also or alternatively send this message after a "path switch request acknowledge" message is received from the MME 450.

At operation 420, upon reception of the UE context release message, the source LAAP 110 may release radio and C-plane related resources associated to the UE context. Any ongoing data forwarding may continue.

Turning now to FIGS. 5a, 5b, and 6, example embodiments in which a LAAP initiates handover procedures and provides indications to the MAP 100 will now be described. With reference to FIG. 5a, an apparatus 20 embodied by or otherwise associated with a MAP, such as MAP 100, may include means, such as the processing circuitry, the processor 22, the communications interface 26 or the like, for causing a measurement configuration indication to be transmitted to a UE, such as UE 10. See operation 500 of FIG. 5a. The measurement configuration indication may, for example, include an indication that measurement reports containing information regarding LA cells, such as LA cell 111 and LA cell 121, are to be transmitted to both the MAP 100 and source LAAP 110, while measurement reports containing information regarding macro cells, such as macro cell 101, are to be transmitted only to the MAP 100. The apparatus 20 may further include means, such as those mentioned above, for receiving a dual connection transfer request message from a source LAAP 110. See operation 510. The apparatus 20 may also include means, such as those mentioned above, for receiving a dual connection transfer request ACK message from a destination LAAP 120. See operation 520. The apparatus 20 may further include means, such as those mentioned above, for receiving a Path Switch Successful indication from an MME 450. See operation 530.

With reference to FIG. 5b, an apparatus 20 embodied by or otherwise associated with a source LAAP, such as the source LAAP 110 depicted in FIG. 1, may include means, as the processing circuitry, the processor 22, the communications interface 26 or the like, for receiving at least one measurement report from a UE 10. See operation 540 of FIG. 5b. The at least one measurement report may include information regarding measurements performed on one or more LA cells, such as destination LA cell 121. The apparatus 20 may further include means, such as those mentioned above, for determining, based on the received at least one measurement report, whether a handover of the UE from the source LAAP 110 to a destination LAAP, such as the destination LAAP 120 depicted in FIG. 1, should be performed. See operation 550. In an instance in which information regarding measurements performed on multiple possible destination LAAPs is received, determining whether a handover of the UE from the source LAAP 110 to a destination LAAP may further include determining, based on the received at least one measurement report, which of the multiple possible destination LAAPs the UE should be handed over to.

The apparatus 20 may further include means, such as the processing circuitry, the processor 22, the communications interface 26 or the like, for causing a handover request message to be transmitted to the destination LAAP. See operation 560 of FIG. 5*b*. The apparatus 20 may also include means, such as those just mentioned, for causing a dual connection transfer request message to be transmitted to a MAP, such as the MAP 100 depicted in FIG. 1. The apparatus 20 may further include means, such as those discussed above, for causing a SN status transfer message to be transmitted to the MAP.

Thus, having described, from the perspectives of apparatuses respectively embodied by or otherwise associated with a MAP and a source LAAP, some of the operations of example embodiments in which an LAAP initiates handover procedures and provides indications to the MAP, these operations, as well as others carried out by additional network entities, will now be discussed in further detail with reference to the signaling diagram depicted in FIG. 6. Again, it will be understood that the various operations described below are performed by apparatuses, such as the apparatus 20 depicted in FIG. 2, embodied by or otherwise associated with the respective network entities and including means, such as the processing circuitry, the processor 22, the communications interface 26 or the like, for carrying out the described operations. In this regard, reference will now be made to numbered operations 600-617:

At operation 600, area restriction information may be provided. For example, a UE context may be provided which includes information regarding roaming restrictions. Information regarding the UE context, such as the area restriction information, may, for example, be stored at source LAAP 110 and may be provided, for example, either at connection establishment or during a Timing Advance (TA) update.

At operation 601, the MAP 100 may configure UE measurement procedures according to the area restriction information and may transmit a measurement configuration indication to the UE 10. The measurement configuration indication may, for example, contain one or more parameters indicating that measurements on LA cells, such as LA cell 111 and LA cell 121, are to be transmitted to the source LAAP 110, while measurements on macro cells, such as macro cell 101, are to be transmitted to the MAP 100. For example, the parameters may indicate that measurements on LA cells are only to be transmitted to the source LAAP 110, while measurements on macro cells are only to be transmitted to the MAP 100.

At operation 602, the UE 10 may transmit at least one measurement report. The circumstances under which the UE 10 transmits the at least one measurement report may be set, for example, by system information, a relevant specification, or by any other source. Based on the received measurement configuration, the UE 10 may transmit information regarding measurements performed on LA cells to the source LAAP 110, and information regarding measurements performed on Macro cells to the MAP 100.

At operation 603, the source LAAP 110 may determine, based on the at least one measurement report on. LA cells, whether to hand off the UE. The determination may further be based on, for example, RRM information.

At operation 604*a*, the source LAAP 110 may cause a handover request message to be transmitted to the destination LAAP 120. The handover request message may include information necessary to prepare the handover at the destination side. For example, the handover request message may include one or more of: a UE X2 signalling context reference at the source LAAP; a UE S1 EPC signalling context reference; a destination cell ID; a $K_{eNB*}$ key; a RRC context, which may include a C-RNTI of the UE in the source LAAP; AS-configuration information; E-RAB context; physical layer ID of the source LA cell; and/or short MAC-I. The UE X2 and/or UE S1 signalling references may enable the destination LAAP 120 to address the source LAAP 110 and the EPC. The E-RAB context may include RNL and TNL addressing information, and QoS profiles of the E-RABs.

At operation 604*b*, the source LAAP may transmit a "dual connection transfer request" message to the MAP. The dual connection transfer request message may include an indication that a new dual connection will be initiated.

At operation 605, the destination LAAP 120 may perform Admission Control based on the received E-RAB QoS information, e.g., to increase the likelihood of a successful handover, if the resources can be granted by the destination LAAP 121. The destination LAAP 121 may configure the required resources according to the received E-RAB QoS information and may reserve a C-RNTI and optionally a RACH preamble. The AS-configuration to be used in the destination LA cell 121 can either be specified independently (e.g., it may be "established") or as a delta compared to the AS-configuration used in the source LA cell 111 (e.g., it may be a "reconfiguration").

At operation 606*a*, the destination LAAP 120 may prepare the handover with Layer-1/Layer-2 (L1/L2) and may be caused to transmit a handover request acknowledge message to the source LAAP 110. The handover request acknowledge message may include a transparent container to be sent to the UE as an RRC message to perform the handover. The container may include a new C-RNTI, target LAAP security algorithm identifiers for the selected security algorithms, a dedicated RACH preamble, and/or other possible parameters, such as access parameters, System Information Blocks (SIBs), etc. The handover request acknowledge message may also include RNL/TNL information for the forwarding tunnels, if necessary. As soon as the source LAAP 110 receives the handover request acknowledge, or as soon as the transmission of the handover command is initiated in the downlink, data forwarding may be initiated.

At operation 606*b*, the destination LAAP may send a "dual connection transfer request ACK" message to the MAP 100. The dual connection transfer request ACK message may include an indication that the new dual connection may be established.

At operation 607, the source LAAP 120 may generate an RRC message, such as an RRCConnectionReconfiguration message, which may include a DualConnectionControlInfor IE, to be transmitted to the UE 10. The source LAAP 110 may perform any necessary integrity protection and ciphering of the message. The UE 10 may receive the RRCConnectionReconfiguration message with necessary parameters (e.g., new C-RNTI, destination LAAP security algorithm identifiers, and/or optionally dedicated RACH preamble, target eNB SIBs, etc.) and may be commanded by the source LAAP 110 to perform the handover. The UE 10 does not need to delay the handover execution for delivering HARQ/ARQ responses to the source LAAP 110.

At operation 608*a*, the source LAAP 110 may transmit a "Sequence Number (SN) status transfer" message to the destination LAAP 120 to convey an uplink PDCP SN receiver status and a downlink PDCP SN transmitter status of E-RABs for which PDCP status preservation applies (e.g., RLC AM). The uplink UL PDCP SN receiver status includes at least the PDCP SN of the first missing UL SDU and may include a bit map of the receive status of the out of sequence UL SDUs that the UE 10 needs to retransmit in the destination LA cell 121, if there are any such SDUs. The downlink PDCP SN transmitter status indicates the next PDCP SN that the destination LAAP 120 shall assign to new SDUs, not having a PDCP SN yet. The source LAAP 110 may omit sending this message, for example, if none of the E-RABs of the UE 10 shall be treated with PDCP status preservation.

At operation 408b, the source LAAP 110 may transmit an SN status transfer message to the MAP 100. This may ensure that the MAP 100 may resume the suspended data traffic service if the handover operation from the source LAAP 110 to the destination LAAP 120 fails.

At operation 609, after receiving the RRCConnectionReconfiguration message including a DualConnectionControlInfor IE, the LIE 10 may detach from the source LA cell 111 and perform synchronisation to the destination LAAP 120 and access the destination cell 121 via RACH, following a contention-free procedure if a dedicated RACH preamble was indicated in the DualConnectionControlInfor, or following a contention-based procedure if no dedicated preamble was indicated. The UE 10 may derive the target LAAP 120 specific keys and configure the selected security algorithms to be used in the destination LA cell.

At operation 610, the destination LAAP 120 may respond by transmitting UL allocation and timing advance.

At operation 611a, once the UE 10 has successfully accessed the destination LA cell 121, the UE may transmit the RRCConnectionReconfigurationComplete message, e.g., including C-RNTI, to confirm the handover, along with an uplink Buffer Status Report, whenever possible, to the destination LAAP 120 to indicate that the handover procedure is completed for the UE 10. The destination LAAP 120 may then verify the C-RNTI sent in the RRCConnectionReconfigurationComplete message. The destination LAAP may then begin sending data to the UE 10 if the handover was successful.

At operation 611b, in an instance in which handover failure occurs, the UE 10 may send a handover failure indication to the MAP 100. The MAP 100 may then return to a normal single connection mode to serve the UE 10 with respect to the remaining packet service.

At operation 612, in an instance in which the handover was successful, the destination LAAP may send a path switch request message to an MME 450 to inform that the UE 10 has changed cells.

At operation 613, the MME 450 may transmit a "modify bearer request" message to the Serving Gateway (SGW) 460. The SGW may then switch the downlink data path to the destination side. The SGW 460 may then send one or more "end marker" packets via the old path to the source LAAP and then can release any U-plane/TNL resources towards the source LAAP.

At operation 614, the SGW 460 may send a modify bearer response message to the MME 450.

At operation 615, the MME 450 may confirm the path switch request message by transmitting a "path switch request acknowledge" message to the destination LAAP 120.

At operation 616, the MME 450 may transmit a Path Switch Successful Indication to the MAP 100, which may implicitly indicate that the new dual connection establishment is completed.

At operation 617, the destination LAAP 120 may transmit a UE CONTEXT RELEASE message to the source LAAP 110, which informs the source LAAP 110 of the successful handover and triggers the release of resources by the source LAAP 110. The destination LAAP may send this message after the path switch request acknowledge message is received from the MME 450.

At operation 618, upon reception of the UE context release message, the source LAAP 110 may release radio and C-plane related resources associated to the UE context. Any ongoing data forwarding may continue.

All of the example embodiments described above may, for example, provide a smooth handover procedure for use in dual connection contexts. Embodiments where the MAP initiates and coordinates handover may have the added benefit of requiring fewer revisions to existing network setups. Embodiments where an LA cell initiates the handover and provides indications to the MAP may provide the added benefit of minimizing latency during the handover procedure.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method, comprising:
  transmitting, by circuitry of a macro access point (MAP), a handover request message to a destination local area access point (LAAP);
  transmitting, by the circuitry, a handover command to a user equipment (UE);
  transmitting, by the circuitry, a data transfer inform message to a source LAAP; and
  receiving, by the circuitry, a UE context release message from the destination LAAP.

2. The method of claim 1, further comprising, before transmitting the handover request to the destination LAAP:
  transmitting at least one measurement configuration indication to be transmitted to the UE;
  receiving at least one measurement report from the UE; and
  determining, by the circuitry, based on the at least one measurement report, whether to initiate a handover of the UE from the source LAAP to the destination LAAP.

3. The method of claim 2, wherein the measurement configuration indication comprises one or more parameters indicating that measurements on a macro cell associated with the MAP and on local area cells are to be reported to the MAP.

4. The method of claim 2, wherein the determination of whether to initiate the handover of the user equipment from the source LAAP to the destination LAAP is further based on Radio Resource Management (RRM) information.

5. The method of claim 1, wherein the handover request message comprises a UE X2 signaling context reference, a UE SI Evolved Packet Core (EPC) signaling context reference, and an Evolved Universal Terrestrial Radio Access Network Radio Access Bearer (E-RAB) context.

6. An apparatus, comprising:
circuitry for a macro access point, the circuitry configured to
transmit a handover request message to a destination local area access point (LAAP);
transmit a handover command to a user equipment (UE);
transmit a data transfer inform message to a source LAAP; and
receive a UE context release message from the destination LAAP.

7. The apparatus of claim 6, wherein the circuitry is further configured to, before transmitting the handover request to the destination LAAP:
transmit a measurement configuration indication to the UE;
receive at least one measurement report from the UE; and
determine, based on the at least one measurement report, whether to initiate a handover of the UE from the source LAAP to the destination LAAP.

8. The apparatus of claim 7, wherein the measurement configuration indication comprises one or more parameters indicating that measurements on a macro cell associated with the MAP and on local area cells are to be reported to the MAP.

9. The apparatus of claim 7, wherein the determination of whether to initiate the handover of the user equipment from the source LAAP to the destination LAAP is further based on Radio Resource Management (RRM) information.

10. The apparatus of claim 6, wherein the handover request message comprises a UE X2 signaling context reference, a UE SI Evolved Packet Core (EPC) signaling context reference, and an Evolved Universal Terrestrial Radio Access Network Radio Access Bearer (E-RAB) context.

11. The apparatus of claim 6, wherein the circuitry is further configured to receive a handover request acknowledge message.

12. The apparatus of claim 6, wherein the handover command comprises a Radio Resource Control (RRC) message.

13. The apparatus of claim 12, wherein the RRC message comprises an RRCConnectionReconfiguration message including a DualConnectionControlInfor Information Element (IE).

14. The apparatus of claim 6, wherein the handover command comprises an indication of whether a current local area connection should be released or whether a dual connection should be released.

15. The apparatus of claim 6, wherein the circuitry is further configured to receive a Sequence Number (SN) status transfer message from the source LAAP.

16. The apparatus of claim 15, wherein the circuitry is further configured to cause the SN status transfer message to be sent to the destination LAAP.

17. The apparatus of claim 6, wherein the circuitry is further configured to receive a handover failure indication from the UE and, in response, establish a singular connection with the UE.

18. The apparatus of claim 6, wherein the circuitry is further configured to receive a path switch request acknowledge message from a Mobility Management Entity (MME).

19. The apparatus of claim 6, wherein the circuitry is further configured to transmit the UE context release message to the source LAAP.

20. A non-transitory computer readable storage medium storing program code portions which, when executed by circuitry of a macro access point (MAP), cause the MAP to:
transmit a handover request message to a destination local area access point (LAAP);
transmit a handover command to a user equipment (UE);
transmit a data transfer inform message to a source LAAP; and
receive a UE context release message from the destination LAAP.

* * * * *